United States Patent [19]

Frezzolini et al.

[11] 4,282,476
[45] Aug. 4, 1981

[54] VARIABLE PRESSURE CONTROL SWITCH FOR BATTERY CHARGING CIRCUIT

[75] Inventors: James Frezzolini; James J. Crawford, both of Ringwood, N.J.

[73] Assignee: Frezzolini Electronics, Inc., Hawthorne, N.J.

[21] Appl. No.: 21,216

[22] Filed: Mar. 16, 1979

[51] Int. Cl.³ .................. H02J 7/04; H01H 35/40
[52] U.S. Cl. ............................. 320/46; 200/83 J; 200/83 S
[58] Field of Search ............. 320/46; 200/83 J, 83 B, 200/83 S, 83 SA

[56] References Cited

U.S. PATENT DOCUMENTS

| 3,281,640 | 10/1966 | Mas ............................. 320/46 |
| 3,301,977 | 1/1967 | Simonin, Jr. .................. 200/83 SA |
| 3,516,279 | 6/1970 | Maziarka ...................... 200/83 J X |
| 3,775,661 | 11/1973 | Frezzolini et al. ............. 320/46 |
| 3,848,517 | 11/1974 | Hawke ......................... 200/83 B X |
| 4,168,415 | 9/1979 | Edwards et al. ................ 200/83 J X |

Primary Examiner—Robert J. Hickey
Attorney, Agent, or Firm—McAulay, Fields, Fisher, Goldstein & Nissen

[57] ABSTRACT

A variable pressure control switch for a battery charging circuit is provided which includes a housing that receives a first member. A chamber is provided in the first member and a diaphragm extends across the chamber to divide the chamber into first and second portions. A first passage communicates with the chamber first portion and extends through the first member and is adapted to be connected with the interior of the battery to be charged so that the interior pressure of the battery is applied to the diaphragm. A second passage is provided in the first member which communicates with the chamber second portion and a piston is slidably received in the second passage. The piston is movable by the diaphragm between a first and a second position. Variable force biasing means engages the piston to prevent movement of the piston to the second position until a preset pressure has been exceeded. Switch means is operable by the piston when the piston is moved to the second position to control the associated charging circuit.

5 Claims, 3 Drawing Figures

VARIABLE PRESSURE CONTROL SWITCH FOR BATTERY CHARGING CIRCUIT

The present invention relates generally to a variable pressure control switch for a battery charging circuit and, more particularly, pertains to a switch that is adapted to be used with a wide variety of batteries to control charging in response to pressure changes.

Many batteries have so-called non-repetitive voltage charging characteristics that require special techniques to charge the batteries since the voltage characteristics of the batteries cannot be relied upon as an indication of full charge. That is, full charge of such batteries cannot be determined simply by sensing the output terminal voltage. In the past, the internal pressure of such batteries have been utilized to control charging. More specifically, as the battery charges, the internal pressure increases until, at full charge, the pressure reaches a preselected value. In U.S. Pat. No. 3,775,661 issued Nov. 27, 1973 entitled RECHARGEABLE BATTERY POWER SOURCE WITH GAS-PRESSURE SWITCH, and assigned to the assignees of the present invention, we disclosed a pressure-sensitive switch for controlling battery charges in response to such increases in pressure.

However, the above-identified switch is preset at the factory for operation at a particular pressure. This limits the versatility of the switch since it can only be used with the type of battery for which is was designed. Moreover, the normal manufacturing variations between batteries of the same type also cause charging variations since the switches are set at an average value which may or may not represent full charge with a particular one of the associated batteries.

Accordingly, a primary object of the present invention is to provide an improved pressure control switch to control battery charging.

A more specific object of this aspect of the invention is to provide a variable pressure control switch which may be set by the operator to operate at a pre-programmed battery pressure.

A further object of the present invention resides in the novel details of construction that provide a variable pressure battery control switch of the type described that is highly reliable and is also economic to fabricate.

Another object of the present invention is to provide a variable pressure battery control switch that may be used in conjunction with batteries presently on the market.

Accordingly, a variable pressure control switch for a battery charging circuit constructed in accordance with the present invention comprises a housing and a pressure chamber in the housing. A first and a second passage communicate with the pressure chamber and the first passage is adapted to be connected with the interior of a battery. A valve member is slidably received in the second passage for movement between first and second positions. Selectably adjustable biasing means engages the valve member to prevent movement of the valve member to the second position until a preset pressure has been exerted against the valve member. A switch is connected with a battery charging circuit and is adapted to be operated by the valve member when the valve member moves to the second position. Accordingly, the biasing force is selectively adjusted to accommodate the particular battery with which the switch is connected.

Other features and advantages of the present invention will become more obvious from a consideration of the following detailed description, when taken in conjunction with the accompanying drawing, in which.

Figure 1:
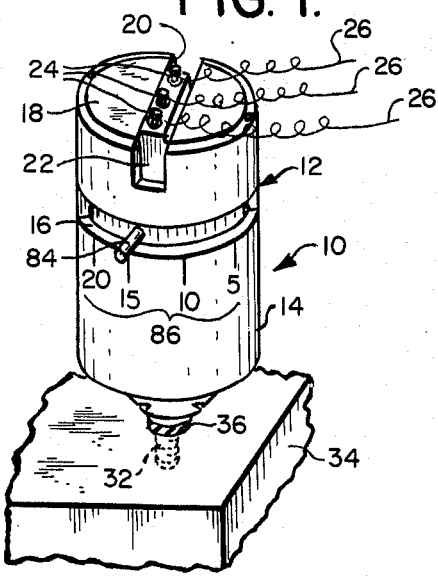
FIG. 1 is a perspective view of a variable pressure control switch constructed in accordance with the present invention as shown mounted on a battery casing.
Figure 2:
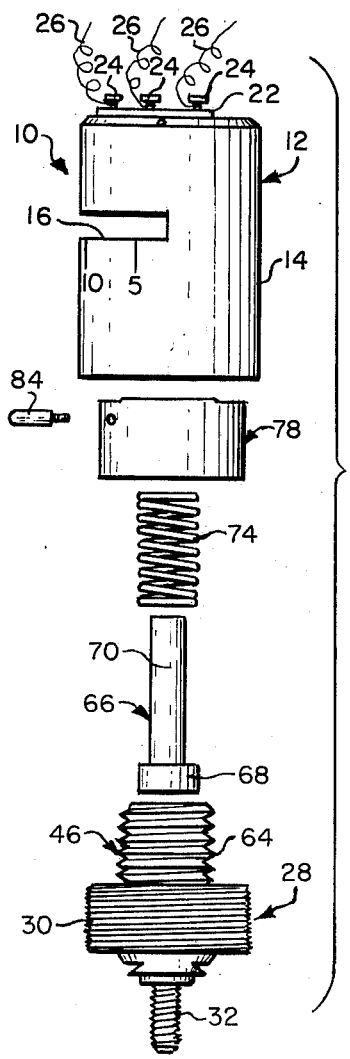
FIG. 2 is an exploded view of the switch shown in FIG. 1.

Accordingly, a variable pressure control switch for a battery charging circuit constructed according to the present invention is designated by the reference character 10 in the FIGS. and includes a housing designated generally by the reference character 12. The housing 12 comprises an outer member 14 of generally tubular construction having an open bottom and an elongated circumferencially extending slot 16 which is located in the upper portion of the tubular wall of the member 14. The top of the member 14 is closed by a top wall 18. A slot 20 is provided in the top wall and extends downwardly into the side walls forming the member 14. Received within the slot is a micro-switch 22 having output terminals 24 that are connected to an associated battery charging circuit by leads 26. The switch is connected to the associated circuitry in such a manner that when the switch is operated, in the manner indicated below, the charging circuit will be deenergized. In other words, the switch is operated when the battery has attained full charge to thereby disconnect the battery charging circuit from the battery per se.

Received within the housing member 14 is a second member or insert 28. The insert 28 may be fabricated from aluminum or the like and includes an outer threaded circular surface 30 that is adapted to be threadedly engaged with internal threads provided adjacent the bottom edge of the tubular member 14. The bottom portion of the member 28 tapers to a reduced diameter portion 32 which is similarly provided with external threads. As shown in FIG. 1, the portion 32 is adapted to be threadedly engaged with a similarly threaded aperture in a battery casing 34. A gasket 36 is sandwiched between the wall of the battery casing and the member 28 to provide a gas-tight fit therebetween.

Figure 3:
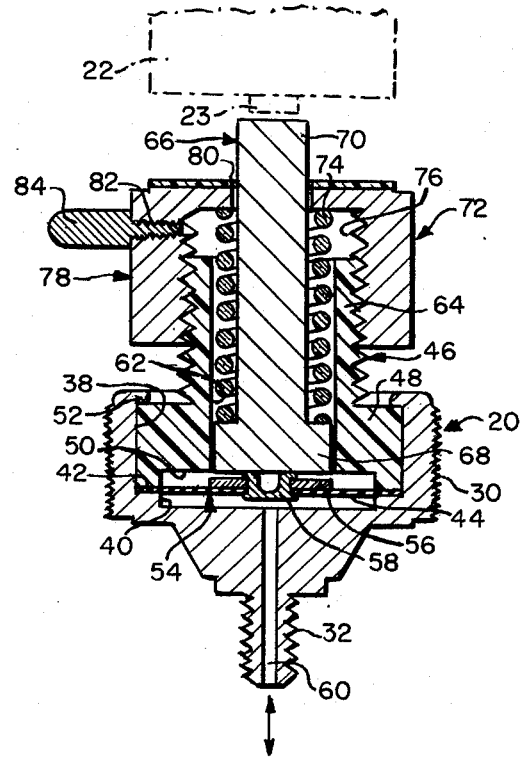
FIG. 3 is a vertical sectional view of the operative portions of the switch shown in FIG. 1.

The upper portion of the member 30 is provided with an enlarged circular recess 38. The lower wall of the recess 38 is provided with a reduced diameter recess 40 that defines a circular seat 42 therebetween. A diaphragm 44, which may be fabricated from rubber, neoprene or the like is received in the recess 38 and the outer edge thereof seats on the seat 42. Also received within the recess 38 is an insert 46 which may be fabricated from plastic or the like. The insert 46 includes an enlarged diameter portion 48 that is received within the recess 38. A centrally located recess 50 is provided in the bottom wall of the recess 48. The outer surface of the bottom wall of the insert 48 seats on the outer edge of the diaphragm 44 so that the outer edge of the diaphragm is effectively clamped between the lower circular wall of the insert 48 and the seat 42. The upper edge of the member 30 is crimped over at 52 to maintain the insert 48 in place. The recesses 40 and 50 define a pressure chamber 54 in the housing which is divided in half by the diaphragm 44. The diaphragm 44 includes a centrally located metal seat 56 which is maintained in place by a rivet 58 extending through the diaphragm. A bore 60 extends downwardly through the member 30 to provide a passage for the communication of the interior pressure from the battery to the underside of the diaphragm 44. A centrally located passage 62 extends upwardly through the insert 48. As shown in FIG. 3, the passage 62 extends through a reduced diameter portion 64 of the insert 48. The passage 62 communicates with the surface of the diaphragm 44 in the pressure chamber 54.

Slidably received within the passage 62 is a valve member designated generally by the reference character 66. The valve member 66 comprises a piston having an enlarged diameter piston head 68 and a reduced diameter piston rod 70 integral therewith. As shown in FIG. 3, the piston head 68 is substantially equal in diameter to the diameter of the passage 62 but is slidable with respect thereto. The piston head is normally adapted to seat on the metal seat 56 of the diaphragm 44. The piston rod 70 extends beyond the top surface of the reduced diameter portion 64 of the insert 46.

Connected with the valve member 66 is a selectively adjustable biasing arrangement designated generally by the reference character 72. More specifically, the biasing arrangement 72 includes a compression spring 74 that receives the piston rod 70 through the center thereof. One end of the spring 74 seats on the upper surface of the piston head 68. The other end of the spring 74 extends beyond the upper edge of the reduced diameter portion 64 of the insert 46. The outer surface of the reduced diameter portion 64 is threaded and engages the internally threaded portion 76 of a cap 78. That is, the cap 78 is internally recessed and is provided with threads so that the cap may be moved axially with respect to the portion 64 simply by rotating the cap with respect thereto. The cap is provided with a central aperture 80 through which the piston rod 70 extends. However, the diameter of the aperture 80 is smaller than the diameter of the spring 74 so that the upper end of the spring 74 bears against the inner surface of the upper wall of the cap 80.

It will now become apparent that by rotating the cap 78 with respect to the portion 64 of the insert 46, the spring 74 may be compressed or expanded. As a result, the pressure that the spring exerts on the piston head 68 will vary depending upon the compression or the extension of the spring. Thus, the force required to move the valve member 66 upwardly against the force of the spring will similarly vary in accordance with the degree of compression of the spring.

The switch 22 is positioned with respect to the valve member 66 so that the armature 23 of the switch is normally in spaced relationship to the top edge of the valve member 66. However, when the valve member 66 is moved upwardly in response to increased pressure from the battery, the upper surface of the valve member 66 contacts the armature 23 of the switch 22 thereby actuating the switch in the manner indicated hereinabove.

The cap 78 is provided with a radially extending threaded aperture 82. The aperture 82 is positioned so that when the elements are in the assembled condition (i.e., when the member 30 is threadedly received in the tubular outer member 14 and the cap 78 is threadedly engaged with the portion 64 of the insert 46) the threaded aperture 82 will be accessible through the slot 16 in the tubular member 14. A handle 84 projects through the slot 16 and includes a rear section that is threadedly engaged in the aperture 82. Thus, by moving the handle either clockwise or counterclockwise, the cap 78 is moved axially thereby compressing or permitting the spring 74 to expand. Effectively, therefore, the pressure at which the switch 10 of the present invention will operate will therefore be dependent upon the position of the handle 84. As a result, the outer surface of the member 14 may be provided with spaced indicia 86 to indicate the pressure of operation of the switch 10.

In operation, the handle 84 is set opposite the desired pressure at which the switch is to operate. It is to be understood that the force constant of the spring 74 is chosen to cooperate with the setting of the cap 78 so that the pressure of operation will correspond with the selected pressure reading on the tubular member 14. When the internal pressure of the battery increases to the pre-programmed pressure, the diaphragm 44 will move upwardly thereby causing the valve member 66 to move upwardly against the force of the spring 74. At the preset pressure, the valve member 66 will have moved upwardly a sufficient distance to depress the armature 23 of the switch 22 thereby to actuate the switch.

If it is desired to change the pressure of operation of the switch, the handle 84 is simply rotated so that it is opposite the new desired pressure. This will either compress the spring 74 or permit the same to expand so that the biasing force on the piston head 68 will similarly change. Accordingly, the pressure required to move the valve member 66 against the force of the spring 74 will similarly change so that the variable pressure control switch 10 will now operate at the new pressure.

Accordingly, there has been described a variable pressure control switch for controlling the charging of a battery which can be made to operate over a plurality of different pressures simply by changing the setting of the switch.

While a preferred embodiment of the invention has been shown and described herein it will become obvious that numerous omissions, changes and additions may be made in such embodiment without departing from the spirit and scope of the present invention.

What is claimed is:

1. A variable pressure control switch for a battery charging circuit comprising, in combination:

a housing;

a first member in said housing;

a chamber in said first member;

a diaphragm extending across said chamber and dividing said chamber into first and second portions;

a first passage communicating with said chamber first portion and extending through said first member and adapted to connect with the interior of the battery to be charged whereby the interior pressure of the battery is applied to said diaphragm;

a second passage in said first member communicating with said chamber second portion;

a piston slidably received in said second passage;

said piston being movable by said diaphragm from a first to a second position;

variable force biasing means engaging said piston for preventing movement of said piston to said second position until a preset pressure has been exceeded;

and switch means operable by said piston when said piston is moved to said second position to control the associated charging circuit;

an elongated slot in said housing;

said biasing means comprising a spring having one end engagement with said piston head, and a second axially movable member engaging the other end of said spring to selectively compress said spring;

said second member comprising a projection extending through said elongated slot in said housing and accessible from the exterior thereof to axially move said second member to vary the force of said spring on said piston head, the ends of said elongated slot forming abutments for said projection to limit the axial movement of said second member;

and indicia on said housing cooperating with said projection to indicate the pressure of operation of said control switch.

2. A variable pressure control switch as in claim 1, in which said piston comprises a piston head normally in contact with said diaphragm, and a piston rod extending through said second passage; said biasing means engaging said piston head to maintain said piston in said first position.

3. A variable pressure control switch as in claim 1, in which said first member comprises a threaded extension adapted to be threaded into a battery casing, and a gasket surrounding said extension to provide a gas-tight fit between said first member and the battery extension.

4. A variable pressure control switch for a battery charging circuit comprising:
   a housing;
   a pressure chamber in said housing;
   a first and second passage communicating with said pressure chamber, said first passage adapted to be connected with the interior of a battery;
   a valve member slidably received in said second passage for movement between first and second positions;
   selectively adjustable biasing means engaging said valve member to prevent movement of said valve member to said second position until a preset pressure has been exerted against said valve member;

and a switch connected with a battery charging circuit and adapted to be operated by said valve member when said valve member moves to said second position;

said housing comprising a first outer member having an elongated slot therethrough;

a second member having an enlarged diameter portion engaged with said first member and a reduced diameter portion, said pressure chamber being positioned in said enlarged diameter portion;

said valve member comprising a piston having a piston rod extending through said reduced diameter portion of said second member, and a piston head communicating with said pressure chamber;

said selectively adjustable biasing means comprising a spring abutting said piston head and extending beyond said second member, and a cap threadedly received on said second member and engaging said spring, whereby rotation of said cap causes axial movement thereof to vary the biasing force of said spring against said piston head;

and a projection on said cap extending through said elongated slot in said housing to permit rotation of said cap from outside said housing, the ends of said elongated slot providing abutments for engagement with said projection to limit axial movement of said cap to thereby limit the variation of the biasing force between preselected values.

5. A variable pressure control switch as in claim 4, in which said pressure chamber comprises a diaphragm engageable with said valve member.

* * * * *